(No Model.) 2 Sheets—Sheet 1.

T. B. SEIBERT.
WHEEL.

No. 573,166. Patented Dec. 15, 1896.

Witnesses,
F. N. Kroemer.
L. A. Minturn

Inventor,
Thomas B. Seibert,
By Joseph A. Minturn,
ATTORNEY.

THE NORRIS PETERS CO., PHOTO-LITHO., WASHINGTON, D. C.

(No Model.) 2 Sheets—Sheet 2.
T. B. SEIBERT.
WHEEL.

No. 573,166. Patented Dec. 15, 1896.

Witnesses,
F. H. Kromer
L. A. Minturn

Inventor,
Thomas B. Seibert
By Joseph A. Minturn
ATTORNEY.

UNITED STATES PATENT OFFICE.

THOMAS B. SEIBERT, OF NORTH INDIANAPOLIS, INDIANA.

WHEEL.

SPECIFICATION forming part of Letters Patent No. 573,166, dated December 15, 1896.

Application filed August 7, 1895. Serial No. 558,468. (No model.)

*To all whom it may concern:*

Be it known that I, THOMAS B. SEIBERT, a citizen of the United States, residing at North Indianapolis, in the county of Marion and State of Indiana, have invented certain new and useful Improvements in Wheels; and I do hereby declare the following to be a full, clear, and exact description of the invention, such as will enable others skilled in the art to which it appertains to make and use the same.

This invention relates to improvements in wheels to be used for all purposes for which wheels have heretofore been used, the objects of the invention being, first, to provide a self-truing wheel that will require no "dish" to give it the requisite rigidity and strength and that will spring back into a normal position after displacement; second, to provide a wheel requiring no lateral bracing of spokes such as is necessary in wheels using wire spokes, but that will be simpler and cheaper to construct, more durable, and lighter in weight than such wheels; third, to afford an elastic and resilient support for the load without the use of other springs than afforded by the wheels themselves and that will afford substantially the same elasticity with a maximum or a minimum load; fourth, to provide a wheel that will take up and receive the impact or concussion at its circumference and by the construction of its spokes will distribute the shock or strain before it reaches the hub, thereby causing no jar or shock to be felt at the load and preventing any interference with the momentum of the load and obtaining also the same results as secured by the use of the pneumatic tire; fifth, to provide means for increasing or lessening the resiliency of the wheel to any extent required; sixth, to provide a felly or rim that cannot be kinked or warped, and, seventh, to provide a wheel in which the resiliency of the spokes will give a forward impulse to the load, whereby a greater load can be carried than is possible with the wheels constructed with rigid spokes, as heretofore employed.

I accomplish the objects of the invention by the mechanism illustrated in the accompanying drawings, in which—

Figure 1:
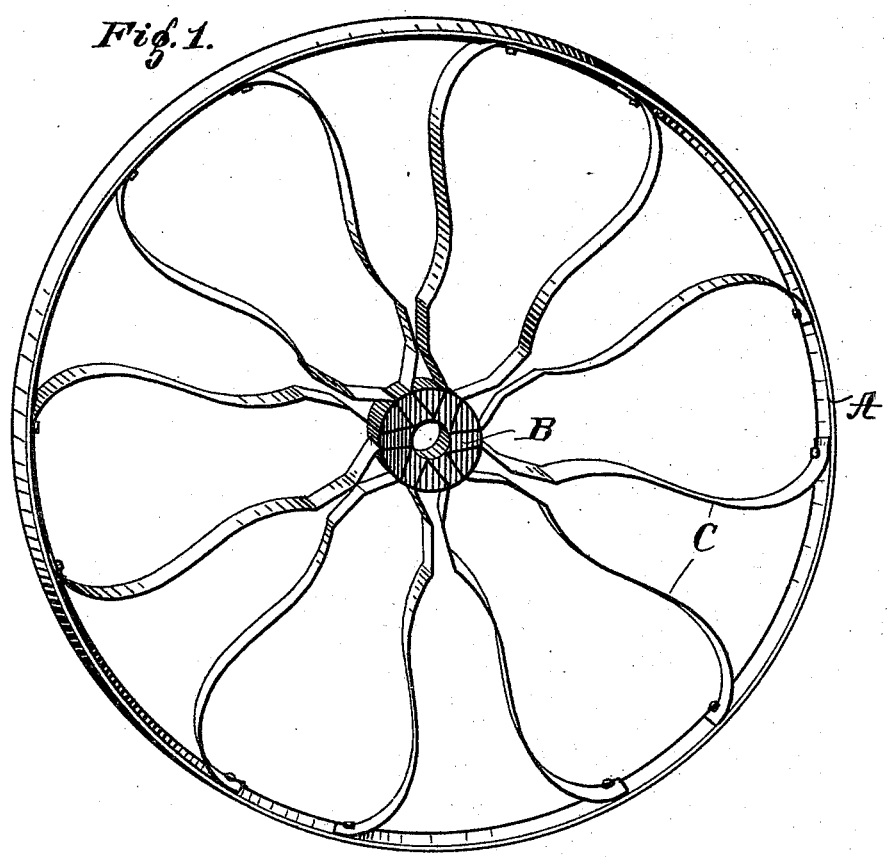
Figure 2:
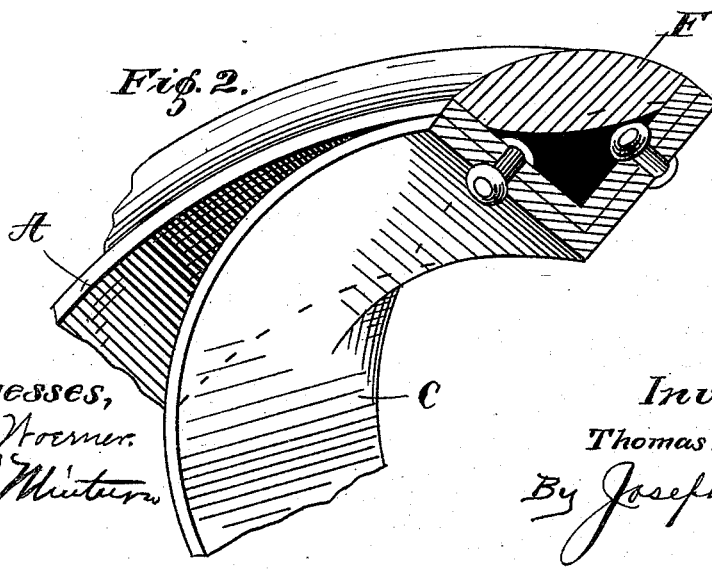
Figure 3:
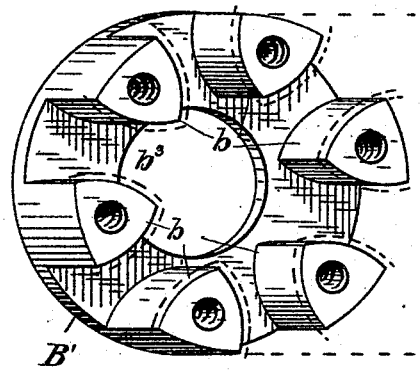
Figure 4:
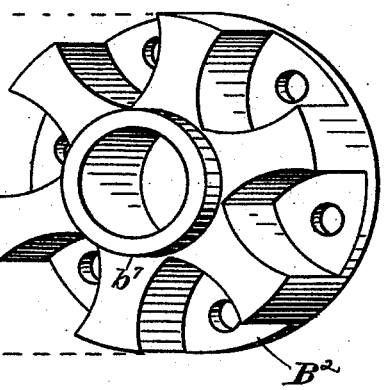
Figure 5:
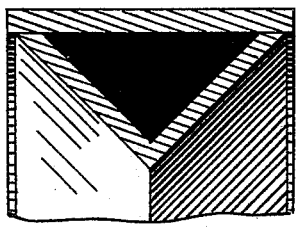
Figure 6:
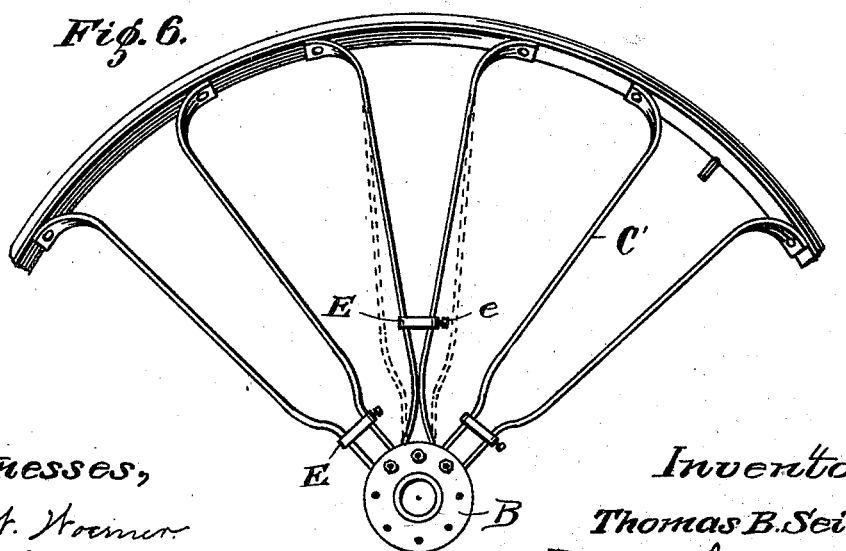

Figure 1 is a view in side elevation, slightly in perspective, of my improved wheel; Fig. 2, a detail in perspective of the rim of my improved wheel, showing the manner of fastening the spokes to the felly or rim and shows the construction and application of the tire. Figs. 3 and 4 are views in perspective of the disunited parts of my two-part hub. Fig. 5 is a detail of my rim, showing the manner of applying a flat iron tire such as is used on vehicles of common form; and Fig. 6 is a detail in side elevation of a modified construction of my wheel, showing a different form of spoke and showing an adjustable clamp by means of which the stiffness of the spokes can be regulated.

Similar letters of reference refer to like parts throughout the several views of the drawings.

A represents the felly, which will preferably be constructed of angle-iron or steel bent so the angle will be on the inside toward the hub, as clearly shown in cross-section in Fig. 2.

B is the hub, made of the two parts B' and B². The part B' has the integral lugs $b$, around which the spokes, which will preferably be formed in pairs, will be placed, as shown by the dotted lines in Fig. 3, and will be held in place by the casting B², the contacting face of which fits into and fills out the space between the spokes, that is, the space between the spokes on the side opposite the lugs $b$. The central opening $b^3$ in the part B' will be large enough to admit the insertion of the inside annular flange $b^7$, which is an integral extension of the casting B², thereby providing a continuous one-piece lining for the inside of the hub. The two parts of the hub will be joined together by means of bolts or screws, which are inserted through the openings in the parts provided for that purpose.

C are the spokes, which are constructed from flat bar steel and will preferably be constructed in integral pairs, the blanks from which they are made being long enough to make two spokes by bending the bar in the middle. The spokes from the hub to the felly can be any shape except straight, the bent shape being essential for the development of the elastic efficiency of the spoke. The outer ends of the spokes will be riveted to the felly in the manner as clearly shown in the drawings. The resiliency of the wheel will be regulated by the shape of the spokes, their thickness, and the number of spokes used, and will vary with the purposes for which the wheels are to be used.

In the modified form shown in Fig. 6 the spokes are connected in pairs by means of the slides E, by which the spokes are forced into contact with each other, so as to form a brace and curtailing the elasticity of the spokes in proportion to the distance the slides are placed from the hub. Set-screws $e$ or other suitable means for locking the slides in any desired position will be provided.

F, Fig. 2, represents a rubber tire connecting the upper edges of the V-shaped rim. The edges of the tire are cemented to the rim, providing an air-tight compartment between the tire and the rim, which will be filled with compressed air, thereby forming an elastic cushion and adding to the resiliency of the wheel. For heavy vehicles, which are subject to rough usage, the V-shaped felly will be provided with the usual flat metal tire, as shown in Fig. 5, and which can be shrunk on in a very substantial manner.

While I consider the V-shaped rim made from angle-iron as superior in point of strength and stiffness to any other form, my improved spokes and hub can be used with great efficiency with the wood felly of usual form, and for that reason I do not wish to limit this invention to the V-shaped rim.

I am aware that wheels have been made in which spring-spokes were used, but the curved spokes used in all such constructions have had their curves arranged all in the same relative direction, that is, all toward the right or all toward the left. Such construction I do not claim; but What I do claim as new, and wish to secure by Letters Patent, is—

1. In a wheel or pulley, the combination with the rim and a two-part hub having male and female lugs, of bent elastic spokes made in integral pairs which are riveted at their outer ends to the rim and have their inner ends secured between the lugs of the two-part hub, said spokes being assembled so the curve of each spoke will be in general direction opposite to the direction of the curvature of the next adjacent spoke and the shape of the spokes such that when forced together the members of each pair will contact with each other at a distance from the hub, less than one-fourth of the length of the spoke.

2. In a wheel or pulley, the combination, with the rim and a two-part hub having male and female lugs, of bent elastic spokes made in integral pairs which are riveted at their outer ends to the rim and have their inner ends secured between the lugs of the two-part hub, said spokes being assembled so the curve of each spoke will be in general direction, opposite to the direction of the curvature of the next adjacent spoke and the shape of the spokes such that when forced together the members of each pair will contact with each other at a distance from the hub less than one-fourth of the length of the spoke and a binding-clasp for each pair of spokes having a set-screw, substantially as described and for the purposes specified.

In testimony whereof I affix my signature in presence of two witnesses.

THOMAS B. SEIBERT.

Witnesses:
JOSEPH A. MINTURN,
F. WOERNER.